(12) United States Patent
Shu et al.

(10) Patent No.: US 10,701,605 B2
(45) Date of Patent: Jun. 30, 2020

(54) DEDICATED NETWORK HANDOVER METHOD, DEDICATED NETWORK TYPE NOTIFICATION METHOD, AND DEVICE

(71) Applicant: Huawei Technologies Co., Ltd., Shenzhen (CN)

(72) Inventors: Lin Shu, Shanghai (CN); Longyu Cao, Shanghai (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 15/473,850

(22) Filed: Mar. 30, 2017

(65) Prior Publication Data
US 2017/0208518 A1 Jul. 20, 2017

Related U.S. Application Data

(63) Continuation of application No. PCT/CN2014/088002, filed on Sep. 30, 2014.

(51) Int. Cl.
*H04W 36/12* (2009.01)
*H04W 88/14* (2009.01)
(Continued)

(52) U.S. Cl.
CPC .......... *H04W 36/12* (2013.01); *H04W 36/36* (2013.01); *H04W 88/14* (2013.01); *H04W 88/18* (2013.01); *H04W 88/02* (2013.01)

(58) Field of Classification Search
CPC ..... H04W 24/10; H04W 28/24; H04W 48/18; H04W 8/24; H04W 36/12; H04W 36/14
See application file for complete search history.

(56) References Cited

U.S. PATENT DOCUMENTS

2004/0017798 A1  1/2004  Hurtta et al.
2010/0142488 A1*  6/2010  Zhang ............... H04W 36/0022
                                                    370/332
(Continued)

FOREIGN PATENT DOCUMENTS

CN      1430840 A    7/2003
CN    101426252 A    5/2009
(Continued)

OTHER PUBLICATIONS

Foreign Communication From a Counterpart Application, Australian Application No. 2014408102, Australian Full Examination Report dated Dec. 14, 2017, 4 pages.
(Continued)

*Primary Examiner* — Jung H Park
(74) *Attorney, Agent, or Firm* — Conley Rose, P.C.

(57) ABSTRACT

A dedicated network handover method, a dedicated network type notification method, and a device, so as to ensure that user equipment (UE) is handed over to a dedicated core network (CN) network element of a corresponding CN type in a handover process, are presented. The CN network element device mainly includes a receiver configured to receive CN type information of UE sent by a first dedicated CN network element; a processor configured to determine, according to the CN type information, identifier information of a second dedicated CN network element that supports a CN type indicated by the CN type information; and the processor configured to hand over, according to the identifier information, the UE to the second dedicated CN network element corresponding to the identifier information.

13 Claims, 6 Drawing Sheets

501

A first dedicated CN network element determines a target CN network element that provides a service for a target cell in which UE is located after a handover is completed, and acquires CN type information of the UE

502

The first dedicated CN network element sends a forward relocation request message to the target CN network element, where the forward relocation request message carries the CN type information of the UE

(51) Int. Cl.
*H04W 36/36* (2009.01)
*H04W 88/18* (2009.01)
*H04W 88/02* (2009.01)

(56) References Cited

U.S. PATENT DOCUMENTS

| | | | |
|---|---|---|---|
| 2011/0188455 | A1 | 8/2011 | Suzuki et al. |
| 2012/0287854 | A1 | 11/2012 | Xie et al. |
| 2013/0095834 | A1 | 4/2013 | Hou et al. |
| 2014/0348129 | A1* | 11/2014 | Yang ................ H04W 36/0016 370/331 |
| 2015/0023250 | A1* | 1/2015 | Xu .......................... H04W 8/26 370/328 |
| 2017/0188280 | A1* | 6/2017 | Watfa ................ H04W 36/0055 |
| 2017/0272921 | A1* | 9/2017 | Kim ........................ H04W 4/14 |

FOREIGN PATENT DOCUMENTS

| | | |
|---|---|---|
| CN | 101552983 A | 10/2009 |
| CN | 103220720 A | 7/2013 |
| EP | 3145228 A1 | 3/2017 |
| JP | 2003534714 A | 11/2003 |
| JP | 2017518006 A | 6/2017 |
| RU | 2503144 C2 | 12/2013 |
| WO | 2015172088 A1 | 11/2015 |
| WO | 2015174702 A1 | 11/2015 |

OTHER PUBLICATIONS

NTT DOCOMO, "P-CR on Solution 1: Redirection after update location procedure", SA WG2 Meeting #104, S2-142879 (revision of S2-142795, S2-142388), Jul. 7-11, 2014, 9 pages.
Foreign Communication From a Counterpart Application, Russian Application No. 2017115060, Russian Office Action dated May 4, 2018, 5 pages.
Foreign Communication From a Counterpart Application, Russian Application No. 2017115060, English Translation of Russian Office Action dated May 4, 2018, 4 pages.
Foreign Communication From a Counterpart Application, Russian Application No. 2017115060, Russian Search Report dated May 4, 2018, 2 pages.
Foreign Communication From a Counterpart Application, Russian Application No. 2017115060, English Translation of Russian Search Report dated May 4, 2018, 2 pages.
Machine Translation and Abstract of Chinese Publication No. CN101552983, Oct. 7, 2009, 44 pages.
'3rd Generation Partnership Project; Technical Specification Group Services and System Aspects; General Packet Radio Service (GPRS); Service description; Stage 2 (Release 13),' 3GPP TS 23.060, V13.0.0, Technical Specification, Sep. 2014, 350 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401, V13.0.0, Technical Specification, Sep. 2014, 308 pages.
"3rd Generation Partnership Project; Technical Specification Group Services and System Aspects; Architecture Enhancements for Dedicated Core Networks; Stage 2 (Release 13)," 3GPP TR 23.707, V0.2.0, Technical Report, Jul. 2014, 24 pages.
"3rd Generation Partnership Project; Technical Specification Group Core Network and Terminals; Domain Name System Procedures; Stage 3 (Release 12)," 3GPP TS 29.303, V12.3.0, Technical Specification, Jun. 2014, 57 pages.
Foreign Communication From a Counterpart Application, PCT Application No. PCT/CN2014/088002, English Translation of International Search Report dated Jun. 19, 2015, 2 pages.
Foreign Communication From a Counterpart Application, PCT Application No. PCT/CN2014/088002, English Translation of Written Opinion dated Jun. 19, 2015, 8 pages.
NTT DOCOMO, "P-CR on Solution 1: Redirection Solution," S2-141710, May 19-23, 2014, 8 pages.
NTT DOCOMO "Discussion on Core Network Type Selection based on the Subscription Information—Report of Offline Discussion," S2-134328, Nov. 11-15, 2013, 26 pages.
Foreign Communication From a Counterpart Application, European Application No. 14903279.9, Extended European Search Report dated Sep. 12, 2017, 10 pages.
Machine Translation and Abstract of Chinese Publication No. CN101426252, May 6, 2009, 36 pages.
Machine Translation and Abstract of Chinese Publication No. CN103220720, Jul. 24, 2013, 25 pages.
Foreign Communication From a Counterpart Application, Chinese Application No. 201480064792.7, Chinese Office Action dated Sep. 30, 2018, 8 pages.
Machine Translation and Abstract of Japanese Publication No. JP2003534714, Nov. 18, 2003, 33 pages.
Machine Translation and Abstract of Japanese Publication No. JP2017518006, Jun. 29, 2017, 39 pages.
Foreign Communication From a Counterpart Application, Japanese Application No. 2017-517115, Japanese Notice of Allowance dated Feb. 12, 2019, 3 pages.

* cited by examiner

DEDICATED NETWORK HANDOVER METHOD, DEDICATED NETWORK TYPE NOTIFICATION METHOD, AND DEVICE

CROSS-REFERENCE TO RELATED APPLICATIONS

This application is a continuation of International Application No. PCT/CN2014/088002, filed on Sep. 30, 2014, the disclosure of which is hereby incorporated by reference in its entirety.

TECHNICAL FIELD

The present disclosure relates to the field of communications technologies, and in particular, to a dedicated network handover method, a dedicated network type notification method, and a device.

BACKGROUND

As mobile communication networks evolve and new applications constantly emerge, users form different communication features in different application fields, and different mobile communication types and corresponding user equipment (UE) types are generated, such as machine type communication (MTC), mobile virtual network communication, and public safety communication. From a perspective of a core network (CN) side, different UE types have different communication requirements, such as different optional feature support, service feature requirements, availability requirements, and congestion management mechanisms.

With a sharp increase of a quantity of UE types, an operator proposes a requirement that different dedicated CNs are deployed for the different UE types. The operator subscribes to a dedicated core network type (CN type) for UE types that have a same communication feature, deploys dedicated CN network elements such as a mobility management network element and a data gateway for the UE types, and registers UE that has a same CN type with a CN network element that is dedicatedly deployed for the UE, so that the operator can perform targeted management and maintenance on UE of different types, and implement dedicated use of a dedicated network, thereby improving efficiency of mobile management and session management for access of a huge quantity of UE and reducing network maintenance costs.

After UE is successfully registered with a dedicated network, if the UE is currently in a connected state and leaves a service area of a current dedicated CN network element because of movement, a handover procedure needs to be triggered to hand over the UE to a CN network element in a target cell. According to an operator requirement for dedicated use of a dedicated network, because the UE needs to keep being registered with a dedicated CN of a corresponding CN type as much as possible, the UE should be handed over to a target CN network element of a same CN type to meet an operator requirement for performing dedicated network management on UE of different CN types.

In a research process, it is found that an existing handover procedure cannot ensure that the UE in a connected state is handed over to the target dedicated CN network element of a same CN type as that of the current dedicated CN network element that serves the UE, and the operator requirement for performing dedicated network management on the UE of different CN types cannot be met.

SUMMARY

Embodiments of the present disclosure provide a dedicated network type notification method, a dedicated network handover method, and a device, so as to ensure that UE is handed over to a dedicated CN network element of a corresponding CN type in a handover process.

Specific technical solutions provided in the embodiments of the present disclosure are as follows.

According to a first aspect, a CN network element device is provided, including a receiving module configured to receive CN type information of UE sent by a first dedicated CN network element, where the first dedicated CN network element is a dedicated CN network element that provides a service for a source cell in which the UE is located in a handover process; a determining module configured to determine, according to the CN type information received by the receiving module, identifier information of a second dedicated CN network element that supports a CN type indicated by the CN type information, where the second dedicated CN network element is a dedicated CN network element that provides a service for a target cell in which the UE is located after a handover is completed; and a handover module configured to hand over, according to the identifier information determined by the determining module, the UE to the second dedicated CN network element corresponding to the identifier information.

With reference to the first aspect, in a first possible implementation, the determining module is configured to determine, according to a CN type supported by the CN network element device, whether the CN network element device itself supports the CN type indicated by the CN type information; and if the CN network element device itself supports the CN type indicated by the CN type information, determine that identifier information of the CN network element device is the identifier information of the second dedicated CN network element; or if the CN network element device itself does not support the CN type indicated by the CN type information, determine, according to the CN type information, the identifier information of the second dedicated CN network element that supports the CN type indicated by the CN type information.

With reference to the first possible implementation of the first aspect, in a second possible implementation, the determining module is configured to acquire identifier information of a dedicated CN network element corresponding to the CN type information from configuration information, and use the identifier information of the dedicated CN network element as the determined identifier information of the second dedicated CN network element that supports the CN type indicated by the CN type information, where the configuration information includes a correspondence between identifier information of at least one dedicated CN network element that can provide a service for the UE and information about a supported CN type.

With reference to the second possible implementation of the first aspect, in a third possible implementation, the determining module is further configured to locally acquire the preset configuration information from the CN network element device; or the determining module is further configured to, after determining that the CN network element device does not support the CN type indicated by the CN type information, perform query on a domain name server (DNS) to obtain the configuration information.

With reference to the second possible implementation of the first aspect, in a fourth possible implementation, the configuration information includes a correspondence between identifier information of each dedicated CN network element and information about a CN type supported by each dedicated CN network element, where each dedicated CN network element is included in a resource pool to which the CN network element device belongs.

With reference to any one of the first aspect to the fourth possible implementation, in a fifth possible implementation, the receiving module is configured to receive a forward relocation request message sent by the first dedicated CN network element, where the forward relocation request message carries the CN type information of the UE.

With reference to the fifth possible implementation of the first aspect, in a sixth possible implementation, the identifier information is address information; and the handover module is configured to forward, according to the address information, the forward relocation request message to the second dedicated CN network element corresponding to the address information, so that the first dedicated CN network element hands over the UE to the second dedicated CN network element after the second dedicated CN network element replies a forward relocation response message to the first dedicated CN network element.

With reference to the fifth possible implementation of the first aspect, in a seventh possible implementation, the identifier information is a unique network element identifier; and the handover module is configured to send a reroute command to a target base station, where the reroute command carries the unique network element identifier and the forward relocation request message, so that the target base station sends the forward relocation request message to the second dedicated CN network element corresponding to the unique network element identifier, and the first dedicated CN network element hands over the UE to the second dedicated CN network element after the second dedicated CN network element replies a forward relocation response message to the first dedicated CN network element.

With reference to the seventh possible implementation of the first aspect, in an eighth possible implementation, the unique network element identifier is a globally unique mobility management entity identifier or a network resource identifier.

According to a second aspect, a dedicated CN network element device is provided, including an acquiring module configured to determine a target CN network element that provides a service for a target cell in which UE is located after a handover is completed, and acquire CN type information of the UE; and a sending module configured to send a forward relocation request message to the target CN network element, where the forward relocation request message carries the CN type information acquired by the acquiring module.

With reference to the second aspect, in a first possible implementation, the dedicated CN network element device further includes a receiving module configured to receive a handover request message that is used for handing over the UE to the target cell and is sent by a source base station, where the source base station is a base station that provides a service for a source cell in which the UE is located in a handover process.

According to a third aspect, a dedicated network handover method is provided, including receiving, by a target core network CN network element, CN type information of UE sent by a first dedicated CN network element, where the first dedicated CN network element is a dedicated CN network element that provides a service for a source cell in which the UE is located in a handover process; determining, by the target CN network element according to the CN type information, identifier information of a second dedicated CN network element that supports a CN type indicated by the CN type information, where the second dedicated CN network element is a dedicated CN network element that provides a service for a target cell in which the UE is located after a handover is completed; and handing over, by the target CN network element according to the identifier information, the UE to the second dedicated CN network element corresponding to the identifier information.

With reference to the third aspect, in a first possible implementation, the determining, by the target CN network element according to the CN type information, identifier information of a second dedicated CN network element that supports a CN type indicated by the CN type information includes determining, by the target CN network element according to a CN type supported by the target CN network element itself, whether the target CN network element itself supports the CN type indicated by the CN type information; and if the target CN network element itself supports the CN type indicated by the CN type information, determining, by the target CN network element, that identifier information of the target CN network element itself is the identifier information of the second dedicated CN network element; or if the target CN network element itself does not support the CN type indicated by the CN type information, determining, by the target CN network element according to the CN type information, the identifier information of the second dedicated CN network element that supports the CN type indicated by the CN type information.

With reference to the first possible implementation of the third aspect, in a second possible implementation, the determining, by the target CN network element according to the CN type information, identifier information of a second dedicated CN network element that supports a CN type indicated by the CN type information includes acquiring, by the target CN network element, identifier information of a dedicated CN network element corresponding to the CN type information from configuration information, and using the identifier information of the dedicated CN network element as the determined identifier information of the second dedicated CN network element that supports the CN type indicated by the CN type information, where the configuration information includes a correspondence between identifier information of at least one dedicated CN network element that can provide a service for the UE and information about a supported CN type.

With reference to the second possible implementation of the third aspect, in a third possible implementation, the configuration information is preset in the target CN network element; or the configuration information is obtained by performing query on a DNS after the target CN network element determines that the target CN network element itself does not support the CN type indicated by the CN type information.

With reference to the second possible implementation of the third aspect, in a fourth possible implementation, the configuration information includes a correspondence between identifier information of each dedicated CN network element and information about a CN type supported by each dedicated CN network element, where each dedicated CN network element is included in a resource pool to which the target CN network element belongs.

With reference to any one of the third aspect to the fourth possible implementation, in a fifth possible implementation, the receiving, by a target core network CN network element, CN type information of UE sent by a first dedicated CN network element includes receiving, by the target CN network element, a forward relocation request message sent by the first dedicated CN network element, where the forward relocation request message carries the CN type information of the UE.

With reference to the fifth possible implementation of the third aspect, in a sixth possible implementation, the identifier information is address information; and the handing over, by the target CN network element according to the identifier information, the UE to the second dedicated CN network element corresponding to the identifier information includes forwarding, by the target CN network element according to the address information, the forward relocation request message to the second dedicated CN network element corresponding to the address information, so that the first dedicated CN network element hands over the UE to the second dedicated CN network element after the second dedicated CN network element replies a forward relocation response message to the first dedicated CN network element.

With reference to the fifth possible implementation of the third aspect, in a seventh possible implementation, the identifier information is a unique network element identifier; and the handing over, by the target CN network element according to the identifier information, the UE to the second dedicated CN network element corresponding to the identifier information includes sending, by the target CN network element, a reroute command to a target base station, where the reroute command carries the unique network element identifier and the forward relocation request message, so that the target base station sends the forward relocation request message to the second dedicated CN network element corresponding to the unique network element identifier, and the first dedicated CN network element hands over the UE to the second dedicated CN network element after the second dedicated CN network element replies a forward relocation response message to the first dedicated CN network element.

With reference to the seventh possible implementation of the third aspect, in an eighth possible implementation, the unique network element identifier is a globally unique mobility management entity identifier or a network resource identifier.

According to a fourth aspect, a dedicated network type notification method is provided, including determining, by a first dedicated core network CN network element, a target CN network element that provides a service for a target cell in which UE is located after a handover is completed, and acquiring CN type information of the UE, where the first dedicated CN network element is a dedicated CN network element that provides a service for a source cell in which the UE is located in a handover process; and sending, by the first dedicated CN network element, a forward relocation request message to the target CN network element, where the forward relocation request message carries the CN type information.

With reference to the fourth aspect, in a first possible implementation, before the determining, by a first dedicated core network CN network element, a target CN network element that provides a service for a target cell in which UE is located, the method further includes receiving, by the first dedicated CN network element, a handover request message that is used for handing over the UE to the target cell and is sent by a source base station that provides a service for the source cell.

Based on the foregoing technical solutions, in the embodiments of the present disclosure, a first dedicated CN network element notifies a target CN network element of CN type information of UE, and the target CN network element determines, according to the CN type information of the UE, a dedicated CN network element that can support a CN type indicated by the CN type information of the UE, obtains identifier information of the dedicated CN network element, uses the identifier information of the dedicated CN network element as identifier information of a second dedicated CN network element, and hands over the UE to a corresponding dedicated CN network element according to the identifier information of the dedicated CN network element, which ensures that the UE is handed over, in a handover process, to the dedicated CN network element that supports the CN type of the UE, and the UE keeps being registered with a dedicated CN network of the corresponding CN type, so as to meet an operator requirement for dedicated use of a dedicated network.

DESCRIPTION OF EMBODIMENTS

Figure 1:
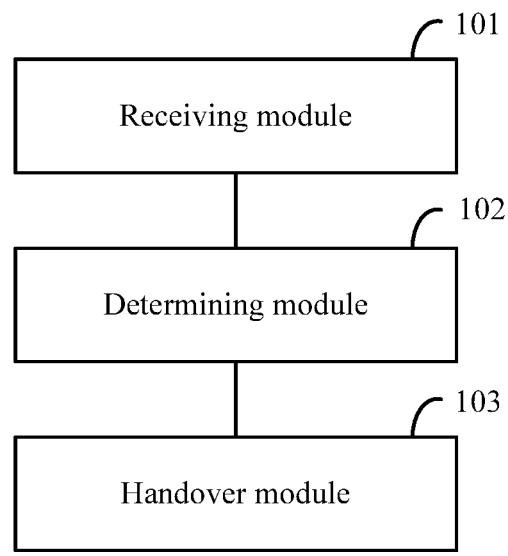
FIG. 1 is a schematic structural diagram of a CN network element device according to an embodiment of the present disclosure.

To make the objectives, technical solutions, and advantages of the present disclosure clearer, the following further describes the present disclosure in detail with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the following embodiments, UE may be any one of the following types, and the UE may be still or moving. The UE may include but is not limited to: a station, a mobile station, a subscriber unit, a personal computer, a laptop computer, a tablet computer, a netbook, a terminal, a cellular phone, a handheld device, a cordless phone, a personal digital assistant (PDA), a data card, a universal serial bus (USB) plug-in device, a mobile WiFi hotspot device (MiFi Devices), a smart watch, smart glasses, a wireless modem, a wireless router, a wireless local loop (WLL) station, and the like. The foregoing UE may be distributed in an entire wireless network.

In the embodiments of the present disclosure, each UE has a subscribed UE type, and each UE type is provided with a dedicated network service by a dedicated CN network element corresponding to the UE type. A UE type may be referred to as a UE usage type, or a UE service type, or all other names that may be used to refer to UE that has a communication feature of a same type, and the name is used by a CN network element or a base station to select a dedicated CN network element that serves the UE. A CN type of the dedicated CN network element is the UE type of the served UE. If a dedicated CN network element can provide a service for a UE type, a CN type of the dedicated CN network element is the UE type, and the CN type of the dedicated CN network element that provides a dedicated network service for the UE is also referred to as a CN type of the UE. As can be seen, a CN type and a UE type are equivalent concepts, and the two concepts may be interchangeably used.

For example, if a UE type of UE is "machine type communication MTC", a CN type of a dedicated CN network element that provides a service for the UE is "machine type communication MTC", and a CN type of the UE is "machine type communication MTC".

In the following embodiments, for ease of visual description, a type of a dedicated CN network element is referred to as a "CN type", but the type of the dedicated CN network element is a UE type of UE served by the dedicated CN network element, and is used to refer to UE that has a communication feature of a same type. A person skilled in the art should understand that by replacing the CN type in the following embodiments with a UE type, a UE usage type, a UE service type, or one of all other names that may be used to refer to the UE that has a communication feature of a same type, a same solution is obtained, which has an equivalent protection scope. It should be noted that because a dedicated CN network element may simultaneously serve multiple UE types, a dedicated CN network element may have multiple CN types.

An application scenario of the present disclosure is as follows: UE is successfully registered with a dedicated CN network element, and is currently in a connected state, and because the UE moves out of a service area of the current dedicated CN network element, a current serving base station requests a source dedicated CN network element (that is, the current dedicated CN network element) to trigger a handover procedure to hand over the UE to a target cell, and a CN type of the UE needs to be notified to a target CN network element before the handover process is executed, where the target CN network element is a CN network element that is selected by the source dedicated CN network element according to a method for selecting a target CN network element in an existing handover process and can serve the target cell.

In the prior art, the source dedicated CN network element selects a dedicated target CN network element that can serve the CN type of the UE, that is, the source dedicated CN network element selects, for the UE in a handover preparation phase, the dedicated target CN network element that supports the CN type of the UE, and then hands over the UE to the selected target CN network element.

It is found that the following problems exist in a manner for selecting a dedicated target CN network element by fully depending on a source dedicated CN network element:

(1) A typical application scenario of deploying a dedicated network is a resource pool (Pool) scenario, and for a cross-pool handover, information about a CN type supported by each CN network element of all adjacent Pools needs to be configured for each CN network element of a source Pool, and considering that one Pool may have multiple adjacent Pools and each Pool may have multiple CN network elements, the configuration may require heavy workload.

(2) If a source dedicated CN network element does not support a Pool feature, but a target cell is located in a Pool, the source dedicated CN network element can select only one specific CN network element (for example, a default CN network element) from the Pool as a target network element, whereas a CN type of the target CN network element may not match a CN type of UE.

Accordingly, the embodiments of the present disclosure are intended to seek a new solution to meet an operator requirement for performing dedicated network management on UE of different CN types.

In the following embodiments, a first dedicated CN network element is a dedicated CN network element that provides a service for a source cell in which UE is located in a handover process, that is, a source dedicated CN network element; a second dedicated CN network element is a dedicated CN network element that provides a service for a target cell in which UE is located after a handover is completed, that is, a target dedicated CN network element; a source base station is a base station that provides a service for a source cell in which UE is located in a handover process; and a target base station is a base station that provides a service for a target cell in which UE is located after a handover is completed.

In a first embodiment of the present disclosure, a CN network element device is provided, which is configured to implement a function of a target CN network element. As shown in FIG. 1, the CN network element device mainly includes a receiving module 101 configured to receive CN type information of UE sent by a first dedicated CN network element; a determining module 102 configured to determine, according to the CN type information received by the receiving module 101, identifier information of a second dedicated CN network element that supports a CN type indicated by the CN type information; and a handover module 103 configured to hand over, according to the identifier information determined by the determining module 102, the UE to the second dedicated CN network element corresponding to the identifier information.

Preferably, the determining module 102 is configured to determine, according to a CN type supported by the CN network element device, whether the CN network element device itself supports the CN type indicated by the CN type information; and if the CN network element device itself supports the CN type indicated by the CN type information, determine that identifier information of the CN network element device is the identifier information of the second dedicated CN network element; or if the CN network element device itself does not support the CN type indicated by the CN type information, determine, according to the CN type information, the identifier information of the second dedicated CN network element that supports the CN type indicated by the CN type information.

Preferably, the determining module 102 is configured to acquire identifier information of a dedicated CN network element corresponding to the CN type information from configuration information, and use the identifier information of the dedicated CN network element as the determined identifier information of the second dedicated CN network element that supports the CN type indicated by the CN type information, where the configuration information includes a correspondence between identifier information of at least one dedicated CN network element that can provide a service for the UE and information about a supported CN type.

In a specific implementation, the determining module 102 locally acquires the preset configuration information from the CN network element device; or after determining that the CN network element device does not support the CN type indicated by the CN type information, the determining module 102 performs query on a DNS to obtain the configuration information.

In a specific implementation, if the CN network element device belongs to a resource pool, the configuration information includes a correspondence between identifier information of each dedicated CN network element and information about a CN type supported by each dedicated CN network element, where each dedicated CN network element is included in the resource pool to which the CN network element device belongs.

Preferably, the receiving module 101 is configured to receive a forward relocation request message sent by the first dedicated CN network element, where the forward relocation request message carries the CN type information of the UE.

In a specific implementation, the identifier information is address information; and the handover module 103 is configured to forward, according to the address information, the forward relocation request message to the second dedicated CN network element corresponding to the address information, so that the first dedicated CN network element hands over the UE to the second dedicated CN network element after the second dedicated CN network element replies a forward relocation response message to the first dedicated CN network element.

In another specific implementation, the identifier information is a unique network element identifier; and the handover module 103 is configured to send a reroute command to a target base station, where the reroute command carries the unique network element identifier and the forward relocation request message, so that the target base station sends the forward relocation request message to the second dedicated CN network element corresponding to the unique network element identifier, and the first dedicated CN network element hands over the UE to the second dedicated CN network element after the second dedicated CN network element replies a forward relocation response message to the first dedicated CN network element.

If the present disclosure is applied to the fourth generation mobile telecommunications system, the unique network element identifier is a globally unique mobility management entity identifier.

If the present disclosure is applied to the second or the third generation mobile telecommunications system, the unique network element identifier is a network resource identifier.

Figure 2:
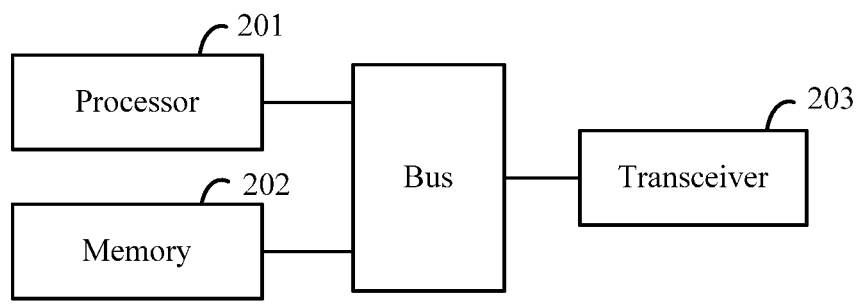
FIG. 2 is another schematic structural diagram of a CN network element device according to an embodiment of the present disclosure.

In a second embodiment of the present disclosure, another CN network element device is provided, which is configured to implement a function of a target CN network element. As shown in FIG. 2, the CN network element device mainly includes a processor 201, a memory 202, and a transceiver 203 that are connected using a bus. The processor 201 is configured to acquire a program from the memory 202, and execute a specific process according to the program; and the transceiver 203 is configured to receive data and send the data under the control of the processor 201, which are as follows: the transceiver 203 is configured to receive CN type information of UE sent by a first dedicated CN network element; and the processor 201 is configured to determine, according to the CN type information received by the transceiver 203, identifier information of a second dedicated CN network element that supports a CN type indicated by the CN type information, and hand over, according to the identifier information, the UE to the second dedicated CN network element corresponding to the identifier information.

Preferably, the processor 201 determines, according to a CN type supported by the CN network element device, whether the CN network element device itself supports the CN type indicated by the CN type information; and if the CN network element device itself supports the CN type indicated by the CN type information, determines that identifier information of the CN network element device is the identifier information of the second dedicated CN network element; or if the CN network element device itself does not support the CN type indicated by the CN type information, determines, according to the CN type information, the identifier information of the second dedicated CN network element that supports the CN type indicated by the CN type information.

Preferably, the processor 201 acquires identifier information of a dedicated CN network element corresponding to the CN type information from configuration information, and uses the identifier information of the dedicated CN network element as the determined identifier information of the second dedicated CN network element that supports the CN type indicated by the CN type information, where the configuration information includes a correspondence between identifier information of at least one dedicated CN network element that can provide a service for the UE and information about a supported CN type.

Preferably, the processor locally acquires the preset configuration information from the CN network element device; or after determining that the CN network element device does not support the CN type indicated by the CN type information, performs query on a DNS to obtain the configuration information.

In a specific implementation, if the CN network element device belongs to a resource pool, the configuration information includes a correspondence between identifier information of each dedicated CN network element and information about a CN type supported by each dedicated CN network element, where each dedicated CN network element is included in the resource pool to which the CN network element device belongs.

Preferably, the transceiver 203 receives a forward relocation request message sent by the first dedicated CN network element, where the forward relocation request message carries the CN type information of the UE.

In a specific implementation, the identifier information is address information; and the processor 201 forwards, according to the address information, the forward relocation request message to the second dedicated CN network element corresponding to the address information, so that the first dedicated CN network element hands over the UE to the second dedicated CN network element after the second dedicated CN network element replies a forward relocation response message to the first dedicated CN network element.

In another specific implementation, the identifier information is a unique network element identifier; and the processor 201 sends a reroute command to a target base station, where the reroute command carries the unique network element identifier and the forward relocation request message, so that the target base station sends the forward relocation request message to the second dedicated CN network element corresponding to the unique network element identifier, and the first dedicated CN network element hands over the UE to the second dedicated CN network element after the second dedicated CN network element replies a forward relocation response message to the first dedicated CN network element.

Preferably, if the present disclosure is applied to the fourth generation mobile telecommunications system, the unique network element identifier is a globally unique mobility management entity identifier.

If the present disclosure is applied to the second or the third generation mobile telecommunications system, the unique network element identifier is a network resource identifier.

Figure 3:
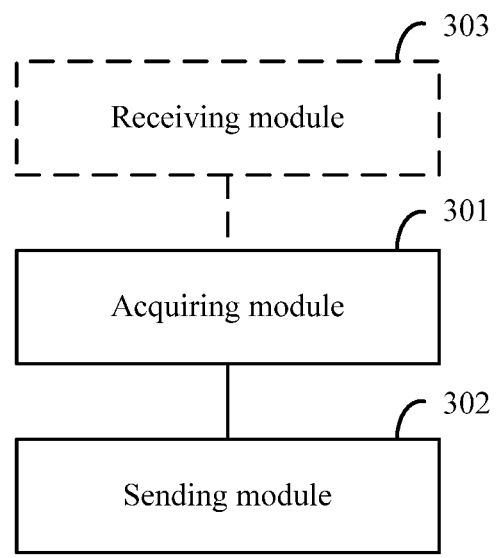
FIG. 3 is a schematic structural diagram of a dedicated CN network element device according to an embodiment of the present disclosure.

In a third embodiment of the present disclosure, a dedicated CN network element device is provided, which is configured to implement a function of a source dedicated CN network element. As shown in FIG. 3, the dedicated CN network element device mainly includes an acquiring module 301 configured to determine a target CN network element that provides a service for a target cell in which UE is located after a handover is completed, and acquire CN type information of the UE; and a sending module 302 configured to send a forward relocation request message to the target CN network element, where the forward relocation request message carries the CN type information acquired by the acquiring module 301.

Preferably, the dedicated CN network element device further includes a receiving module 303 configured to, before the acquiring module 301 determines the target CN network element that provides a service for the target cell in which the UE is located, receive a handover request message that is used for handing over the UE to the target cell and is sent by a source base station.

Figure 4:
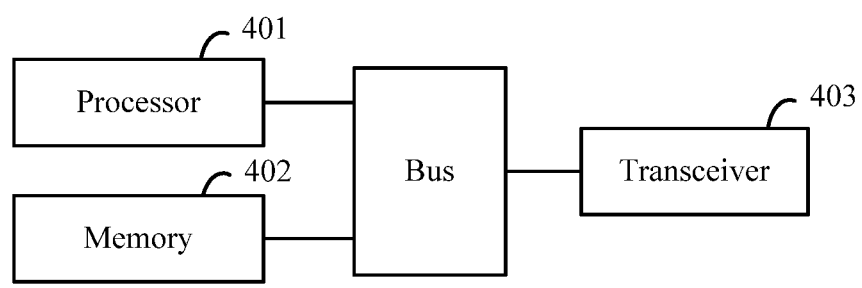
FIG. 4 is another schematic structural diagram of a dedicated CN network element device according to an embodiment of the present disclosure.

In a fourth embodiment of the present disclosure, another dedicated CN network element device is provided, which is configured to implement a function of a source dedicated CN network element. As shown in FIG. 4, the dedicated CN network element device mainly includes a processor 401, a memory 402, and a transceiver 403 that are connected using a bus. The processor 401 is configured to acquire a program from the memory 402, and execute a specific process according to the program; and the transceiver 403 is configured to receive data and send the data under the control of the processor 401, which are as follows: the processor 401 is configured to determine a target CN network element that provides a service for a target cell in which UE is located after a handover is completed, and acquire CN type information of the UE; and the transceiver 403 is configured to send a forward relocation request message to the target CN network element, where the forward relocation request message carries the CN type information acquired by the processor 401.

Preferably, the transceiver 403 is further configured to, before the processor 401 determines the target CN network element that provides a service for the target cell in which the UE is located, receive a handover request message that is used for handing over the UE to the target cell and is sent by a source base station.

Figure 5:
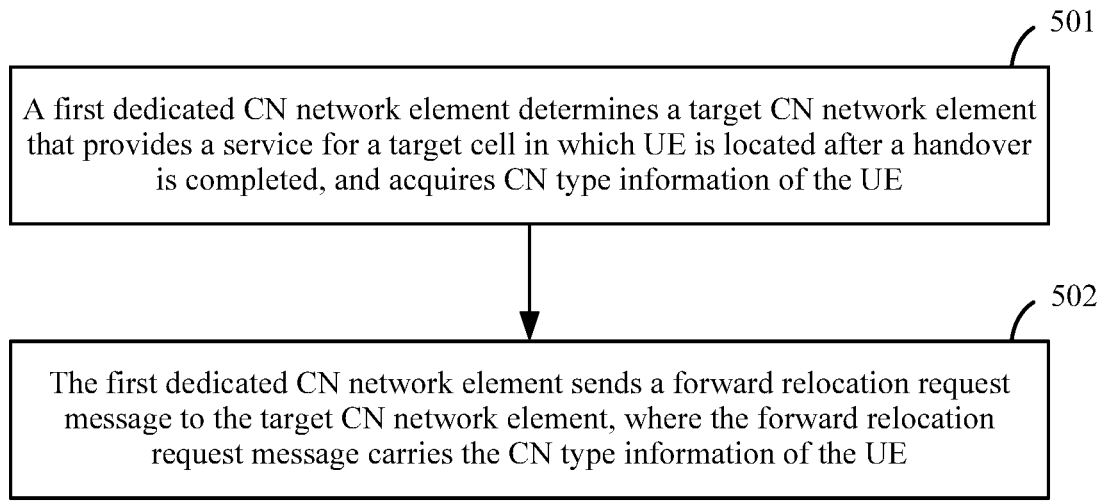
FIG. 5 is a schematic flowchart of a method for notifying a dedicated network type of UE by a first dedicated CN network element according to an embodiment of the present disclosure.

In a fifth embodiment of the present disclosure, as shown in FIG. 5, a detailed method procedure in which a first dedicated CN network element notifies a dedicated network type of UE is as follows, including the following steps.

Step 501: The first dedicated CN network element determines a target CN network element that provides a service for a target cell in which the UE is located after a handover is completed, and acquires CN type information of the UE.

The target CN network element is selected by the first dedicated CN network element according to a method for selecting a target CN network element in an existing handover procedure, and the target CN network element may not be a dedicated CN network element whose CN type is consistent with a CN type of the UE.

Before the first dedicated CN network element determines the target CN network element that provides a service for the target cell in which the UE is located after the handover is completed, the first dedicated CN network element receives a handover request message that is used for handing over the UE to the target cell and is sent by a source base station.

Since the UE is registered with a network in which the first dedicated CN network element is located, the first dedicated CN network element stores the CN type information of the UE.

Step 502: The first dedicated CN network element sends a forward relocation request message to the target CN network element, where the forward relocation request message carries the CN type information of the UE.

The target CN network element determines, according to the CN type of the UE, a dedicated CN network element that can support the CN type, so that the UE keeps being registered with the dedicated CN network element of the corresponding CN type.

Figure 6:
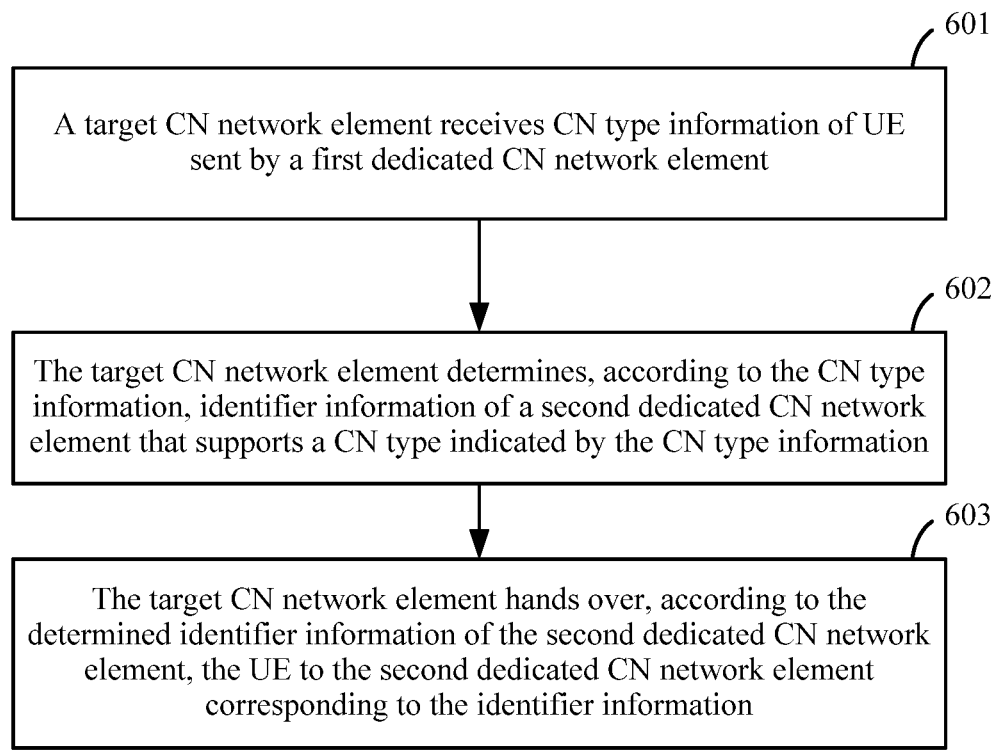
FIG. 6 is a schematic flowchart of a method for handing over UE between dedicated networks according to an embodiment of the present disclosure.

In a sixth embodiment of the present disclosure, as shown in FIG. 6, a detailed method procedure in which UE is handed over between dedicated networks is as follows.

Step 601: A target CN network element receives CN type information of UE sent by a first dedicated CN network element.

Preferably, the target CN network element receives a forward relocation request message sent by the first dedicated CN network element, where the forward relocation request message carries the CN type information of the UE.

Step 602: The target CN network element determines, according to the CN type information, identifier information of a second dedicated CN network element that supports a CN type indicated by the CN type information.

Preferably, the target CN network element acquires identifier information of a dedicated CN network element corresponding to the CN type information of the UE from configuration information, and uses the identifier information of the dedicated CN network element as the determined identifier information of the second dedicated CN network element that supports the CN type indicated by the CN type information, where the configuration information includes a correspondence between identifier information of at least one dedicated CN network element that can provide a service for the UE and information about a CN type supported by the at least one dedicated CN network element.

The configuration information includes the correspondence between the identifier information of the at least one dedicated CN network element that can provide a service for a location in which the UE is currently located and the CN type supported by the at least one dedicated CN network element, and information about the location in which the UE is currently located may be obtained from a target cell.

Preferably, if the target CN network element belongs to a resource pool, the configuration information includes a correspondence between identifier information of each dedicated CN network element and information about a CN type supported by each dedicated CN network element, where each dedicated CN network element is included in the resource pool to which the target CN network element belongs.

Preferably, the target CN network element determines, according to a CN type supported by the target CN network element itself, whether the target CN network element itself supports the CN type indicated by the CN type information; and if the target CN network element itself supports the CN type indicated by the CN type information, the target CN network element determines that identifier information of the target CN network element itself is the identifier information of the second dedicated CN network element; or if the target CN network element itself does not support the CN type indicated by the CN type information, the target CN network element determines, according to the CN type information of the UE, the identifier information of the second dedicated CN network element that supports the CN type indicated by the CN type information. When the target CN network element determines that the target CN network element itself does not support the CN type indicated by the CN type information, the target CN network element obtains, from the configuration information according to the CN type information of the UE, one piece of the identifier information of the dedicated CN network element corresponding to the CN type information of the UE, and uses the piece of the identifier information of the dedicated CN network element as the identifier information of the second dedicated CN network element.

Preferably, a manner for acquiring the configuration information includes but is not limited to the following two implementation manners.

In a first implementation manner, the configuration information is preset in the target CN network element, and is directly and locally obtained by the target CN network element.

In a second implementation manner, the configuration information is obtained by the target CN network element by performing query on a DNS after determining that the target CN network element does not support the CN type indicated by the CN type information.

Corresponding to the second implementation manner, a specific process in which the target CN network element obtains the configuration information by performing query on the DNS is as follows.

When determining that the target CN network element itself does not support the CN type indicated by the CN type information of the UE, the target CN network element initiates a query request to the DNS, where the query request is used to query configuration information of all dedicated CN network elements that can provide a service for a location area in which the UE is located. The DNS returns the configuration information to the target CN network element according to the query request, where the configuration information includes correspondences between identifier information of all the dedicated CN network elements that can provide a service for the location area in which the UE is located and information about CN types supported by the dedicated CN network elements.

Step 603: The target CN network element hands over, according to the determined identifier information of the second dedicated CN network element, the UE to the second dedicated CN network element corresponding to the identifier information.

In a specific implementation, the determined identifier information of the second dedicated CN network element may be address information of the second dedicated CN network element, or may be a unique network element identifier of the second dedicated CN network element.

In a specific implementation, if the determined identifier information of the second dedicated CN network element is the address information of the second dedicated CN network element, a specific process in which the target CN network element hands over the UE to the dedicated CN network element corresponding to the determined identifier information of the second dedicated CN network element is as follows.

The target CN network element forwards, according to the determined address information of the second dedicated CN network element, the forward relocation request message to the second dedicated CN network element corresponding to the address information, and the first dedicated CN network element hands over the UE to the second dedicated CN network element after the second dedicated CN network element replies a forward relocation response message to the first dedicated CN network element.

The second dedicated CN network element sends a handover request message to a target base station, receives a handover request acknowledgement message replied by the target base station, and forwards the forward relocation response message to the first dedicated CN network element, and the first dedicated CN network element hands over the UE to the second dedicated CN network element.

In another specific implementation, if the determined identifier information of the second dedicated CN network element is the unique network element identifier of the second dedicated CN network element, a specific process in which the target CN network element hands over the UE to the second dedicated CN network element corresponding to the determined identifier information of the second dedicated CN network element is as follows.

The target CN network element sends a reroute command to a target base station, where the reroute command carries the determined unique network element identifier of the second dedicated CN network element and the forward relocation request message. The target base station sends the forward relocation request message to the second dedicated CN network element corresponding to the unique network element identifier. After the second dedicated CN network element replies a forward relocation response message to the first dedicated CN network element, the first dedicated CN network element hands over the UE to the second dedicated CN network element corresponding to the unique network element identifier.

If the present disclosure is applied to the fourth generation mobile telecommunications system, the determined unique network element identifier of the second dedicated CN network element is a globally unique mobility management entity identifier of the second dedicated CN network element.

If the present disclosure is applied to the second or the third generation mobile telecommunications system, the determined unique network element identifier of the second dedicated CN network element is a network resource identifier of the second dedicated CN network element.

The following uses three specific embodiments to describe the dedicated CN network handover process provided in this embodiment of the present disclosure in detail.

In actual application, a dedicated CN network element in the embodiments of the present disclosure may be deployed on a second generation mobile telecommunications system (2G) network, a third generation mobile telecommunications system (3G) network, and a 4G network, and may cover a circuit switched (CS) domain and a packet switched (PS)

domain. For ease of description, the three specific embodiments are described using only the fourth generation mobile telecommunications system (4G) as an example, for example, a Long Term Evolution (LTE) system, and are described using an example in which the CN network element is a mobility management entity (MME).

Figure 7:
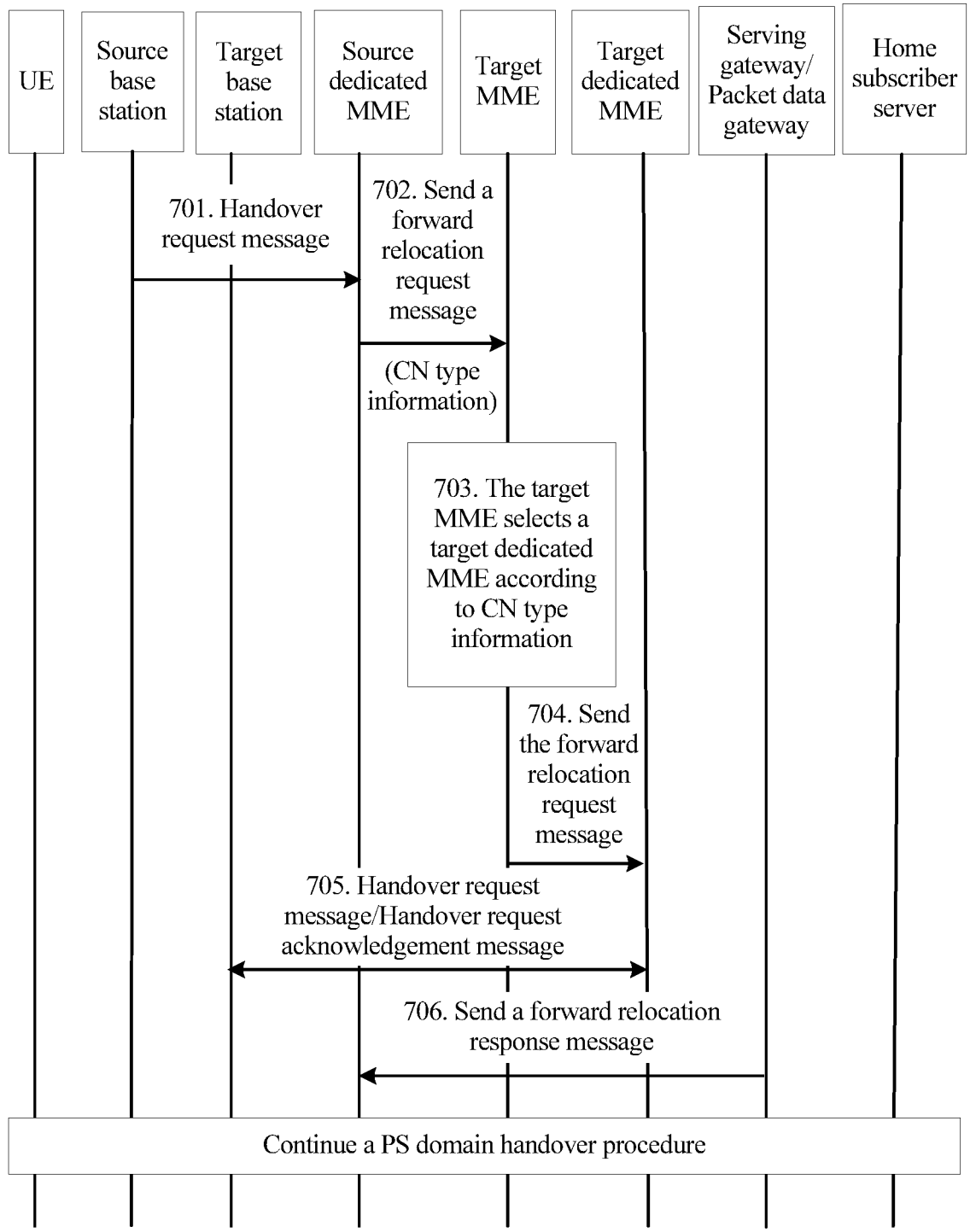
FIG. 7 is a flowchart of performing a dedicated CN network handover according to an embodiment of the present disclosure.

In a first specific embodiment, as shown in FIG. 7, a specific process of performing a dedicated CN network handover is as follows.

Step 701: UE is successfully registered with a source dedicated network, and the UE is currently in a connected state, and because the UE moves out of a service area of a current dedicated CN network element (a dedicated MME), a source base station (eNodeB) triggers a handover procedure to hand over the UE to a target cell, and the source eNodeB sends a handover request (Handover Required) message to a source dedicated MME.

Step 702: The source dedicated MME selects, according to a method for selecting a target MME in an existing handover process, a target MME that serves the target cell, and sends a forward relocation request message to the target MME, where the forward relocation request message carries CN type information of the UE.

Because the UE has been registered with the dedicated network, the CN type information of the UE is stored on the source dedicated MME.

Step 703: The target MME first checks whether the target MME itself can serve a CN type indicated by the CN type information, that is, whether a CN type supported by the target MME itself is consistent with the CN type of the UE, and if the CN type supported by the target MME is consistent with the CN type of the UE, hands over the UE to the target MME according to a normal handover procedure; otherwise, determines, according to the CN type information of the UE, address information of a target dedicated MME that can provide a service for the UE and supports the CN type indicated by the CN type information of the UE.

The target MME acquires address information of a target dedicated CN network element corresponding to the CN type information of the UE from configuration information, where the configuration information includes a correspondence between address information of at least one dedicated MME that can provide a service for a location area in which the UE is currently located and information about a CN type supported by the at least one dedicated MME.

If the target MME belongs to an MME resource pool, the configuration information needs to include a correspondence between information about a CN type supported by each MME of the Pool and address information of the MME, so that address information corresponding to the MME can be determined using the CN type information.

Step 704: The target MME forwards the forward relocation request message to the selected target dedicated MME.

Step 705: For the selected target dedicated MME, it can be said that the forward relocation request message is directly received from the source dedicated MME, and then the selected target dedicated MME sends a handover request message to a target eNodeB to request to establish a context and an air interface bearer resource for the UE; and the target eNodeB replies a handover request acknowledgement message to the selected target dedicated MME.

Step 706: The selected target dedicated MME directly replies a forward relocation response message to the source dedicated MME.

The source dedicated MME continues to execute a subsequent PS domain handover procedure to hand over the UE to the target dedicated MME that has the same CN type as that of the UE.

If the target cell is located in an MME resource pool, the target MME selects a dedicated MME only from the Pool. If there is no corresponding dedicated MME in the Pool, the target MME performs a handover according to the normal handover procedure to hand over the UE to the target MME, which indicates that the UE enters a cell that cannot provide a dedicated network service.

Figure 8:
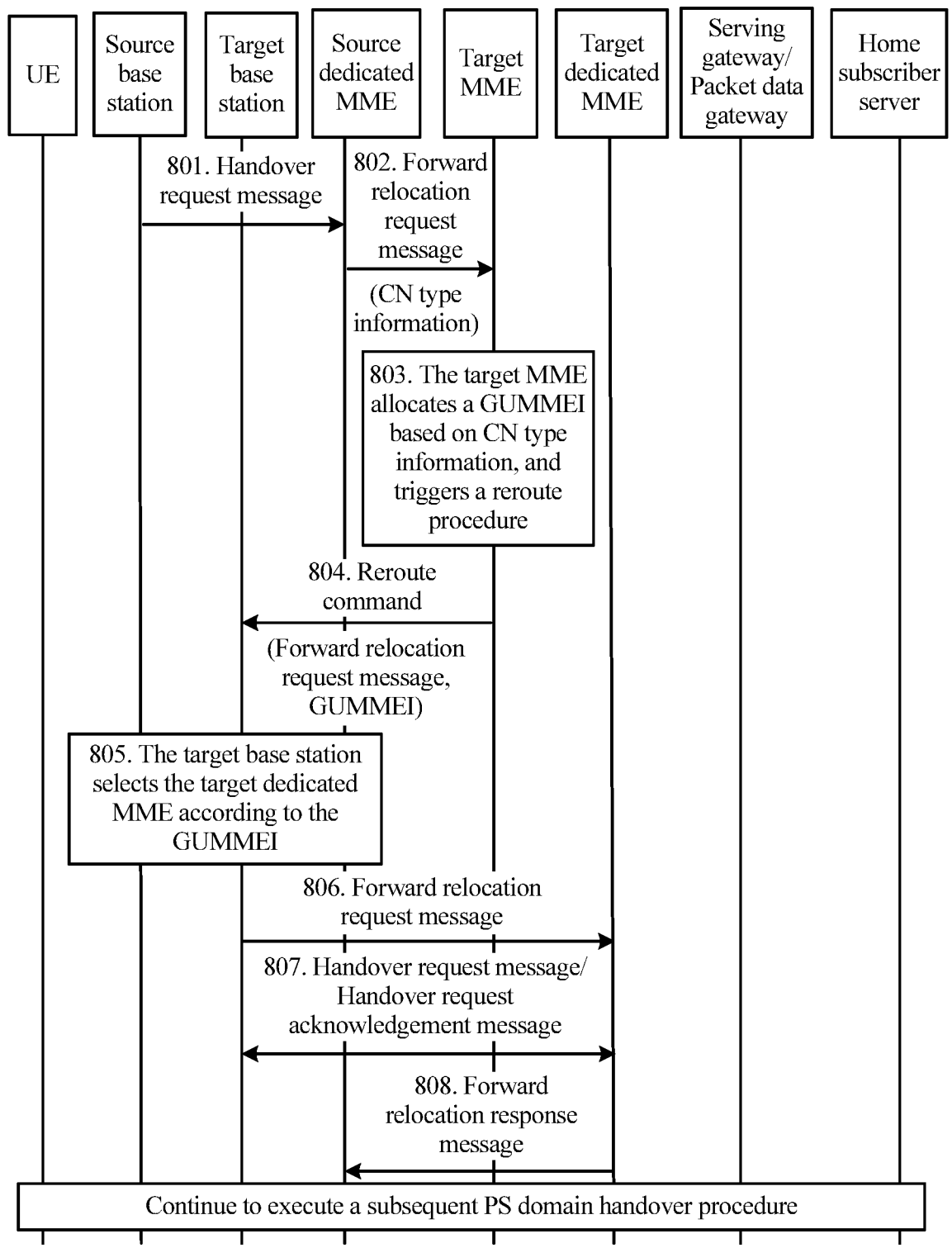
FIG. 8 is another flowchart of performing a dedicated CN network handover according to an embodiment of the present disclosure.

In a second specific embodiment, as shown in FIG. 8, a specific process of performing a dedicated CN network handover is as follows.

Step 801 and step 802 are completely the same as step 701 and step 702 in the foregoing first specific embodiment, and are not repeated herein.

Step 803: The target MME first checks whether the target MME can serve a CN type indicated by the CN type information, that is, whether a CN type supported by the target MME itself is consistent with the CN type of the UE, and if the CN type supported by the target MME is consistent with the CN type of the UE, hands over the UE to the target MME according to a normal handover procedure; otherwise, determines, according to the CN type information of the UE, a target dedicated CN network element that can provide a service for the UE and supports the CN type of the UE, and executes step 804.

A unique network element identifier of a target dedicated MME corresponding to the CN type information is acquired from configuration information according to the CN type information of the UE, where the preset configuration information includes a correspondence between a unique network element identifier of at least one dedicated MME that can provide a service for a location area in which the UE is currently located and information about a CN type supported by the at least one dedicated MME.

For a 4G LTE network, the unique network element identifier is a globally unique MME identifier (GUMMEI); for a 2G/3G network, the unique network element identifier is a network resource identifier (NRI).

It should be noted that an operator needs to configure a unique network element identifier for each dedicated CN network element of a deployed dedicated network, where the unique network element identifier is used to select a corresponding dedicated CN network element. For example, GUMMEIs of a particular quantity are reserved for a dedicated MME, and NRIs of a particular quantity are reserved for a dedicated Serving GPRS Support Node (SGSN).

Step 804: The target MME initiates a reroute command to a target eNodeB, where the command carries an allocated GUMMEI of the target dedicated MME and the forward relocation request message received from the target dedicated MME.

Step 805 and step 806: The target eNodeB selects the target dedicated MME according to the GUMMEI, and forwards the forward relocation request message to the selected target dedicated MME.

Step 807: For the selected target dedicated MME, it can be said that the forward relocation request message is directly received from the source dedicated MME, and then the selected target dedicated MME sends a handover request message to the target eNodeB to request to establish a context and an air interface bearer resource for the UE; and the target eNodeB replies a handover request acknowledgement message to the selected target dedicated MME.

Step 808: The selected target dedicated MME directly replies a forward relocation response message to the source dedicated MME, and the source dedicated MME continues to execute a subsequent PS domain handover procedure to hand over the UE to the dedicated MME that has the same CN type as that of the UE.

If the target cell is located in an MME resource pool, the target MME selects a dedicated MME only from the resource pool. If there is no corresponding dedicated MME in the resource pool, the target eNodeB sends the forward relocation request message to the target MME, and the target MME hands over the UE to the target MME itself according to the normal handover procedure, which indicates that the UE enters a cell that cannot provide a dedicated network service.

Figure 9:
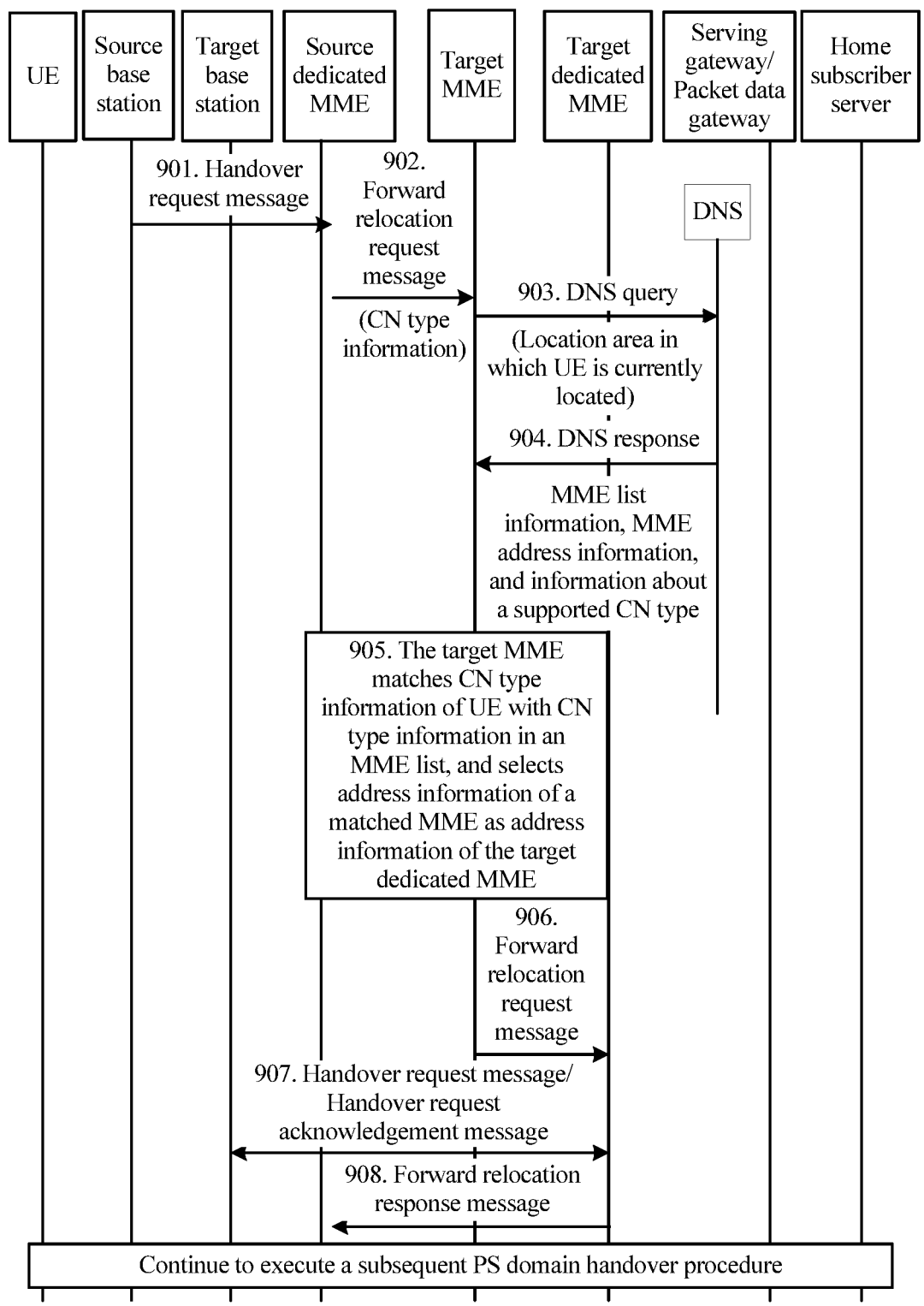
FIG. 9 is another flowchart of performing a dedicated CN network handover according to an embodiment of the present disclosure.

In a third specific embodiment, as shown in FIG. 9, a specific process of performing a dedicated CN network handover is as follows.

Step 901 and step 902 are completely the same as step 701 and step 702 in the foregoing first specific embodiment, and are not repeated herein.

Step 903: The target MME first checks whether the target MME can serve a CN type indicated by the CN type information, that is, whether a CN type supported by the target MME itself is consistent with the CN type of the UE, and if the CN type supported by the target MME is consistent with the CN type of the UE, hands over the UE to the target MME according to a normal handover procedure; otherwise, the target MME initiates a normal query request to a DNS, to search for address information of all MMEs that can serve a location area in which the UE is currently located.

Step 904: The DNS returns, according to the requested location area information, list information of a multipurpose internet mail extension (MIME) that serves the location area, where in addition to address information of each MME, the list information includes information about a CN type supported by each MME.

Step 905: The target MME matches the CN type information of the UE with CN type information in the MME list information returned by the DNS to find address information of an MME that matches the CN type information of the UE and selects the MME as the target dedicated MME.

Step 906: The target MME forwards the forward relocation request message to the selected target dedicated MME.

Step 907: For the selected target dedicated MME, it can be said that the forward relocation request message is directly received from the source dedicated MME, and then the selected target dedicated MME sends a handover request message to a target eNodeB to request to establish a context and an air interface bearer resource for the UE; and the target eNodeB replies a handover request acknowledgement message to the selected target dedicated MME.

Step 908: The selected target dedicated MME directly replies a forward relocation response message to the source dedicated MME, and the source dedicated MME continues to execute a subsequent PS domain handover procedure to hand over the UE to the selected target dedicated MME that has the same CN type as that of the UE.

If the target cell is located in an MME resource pool, the target MME selects a dedicated MME only from the resource pool, and if there is no corresponding dedicated MME in the resource pool, the target MME performs a handover according to the normal handover procedure to hand over the UE to the target MME, which indicates that the UE enters a cell that cannot provide a dedicated network service.

Based on the foregoing technical solutions, in the embodiments of the present disclosure, a first dedicated CN network element notifies a target CN network element of CN type information of UE, and the target CN network element determines, according to the CN type information of the UE, a second dedicated CN network element that can support a CN type indicated by the CN type information of the UE, obtains identifier information of the second dedicated CN network element, and hands over the UE to a corresponding dedicated CN network element according to the identifier information of the second dedicated CN network element, which ensures that the UE is handed over, in a handover process, to the dedicated CN network element that supports the CN type of the UE, and the UE keeps being registered with a dedicated CN network of the corresponding CN type, so as to meet an operator requirement for dedicated use of a dedicated network.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A target core network (CN) network element device, comprising:
    a receiver configured to receive a forward relocation request message comprising CN type information of a user equipment (UE) from a first dedicated CN network element, wherein the first dedicated CN network element is a dedicated CN network element that provides a service for a source cell in which the UE is located in a handover process, and wherein the handover process is triggered when the first dedicated CN network element receives a handover request from a source base station serving the UE in the source cell; and
    a processor coupled to the receiver and configured to:
        determine, according to the CN type information, identifier information of a second dedicated CN network element that supports a CN type indicated by the CN type information, wherein the second dedicated CN network element is a dedicated CN network element that provides a service for a target cell in which the UE is located after the handover process is completed;
        forward the forward relocation request message received from the first dedicated CN network element to the second dedicated CN network element;
        handover, according to the identifier information, the UE to the second dedicated CN network element corresponding to the identifier information, wherein the handover includes requesting a target base station to establish an air interface for the UE, and wherein the target base station is configured to serve the UE after the handover process is completed; and
        acquire identifier information of a third dedicated CN network element that supports the CN type indicated by the CN type information responsive to the target CN network element determining, according to the CN type information, the identifier information of the second dedicated CN network element that supports the CN type indicated by the CN type information when the target CN network element itself does not support the CN type indicated by the CN type information.

2. The target CN network element device of claim 1, wherein the processor is further configured to:
    determine, according to a CN type supported by the CN network element device, whether the CN network element device itself supports the CN type indicated by the CN type information;
    determine that identifier information of the CN network element device is the identifier information of the second dedicated CN network element when the CN network element device itself supports the CN type indicated by the CN type information; and
    determine, according to the CN type information, the identifier information of the second dedicated CN network element that supports the CN type indicated by the CN type information when the CN network element device itself does not support the CN type indicated by the CN type information.

3. The target CN network element device of claim 1, wherein each dedicated CN network element is included in a resource pool to which the CN network element device belongs, and wherein the forward relocation request message includes a correspondence between identifier information of each dedicated CN network element and information about a CN type supported by each dedicated CN network element.

4. A dedicated network handover method, comprising:
    receiving, by a target core network (CN) network element, a forward relocation request message comprising CN type information of user equipment (UE) from a first dedicated CN network element, wherein the first dedicated CN network element is a dedicated CN network element that provides a service for a source cell in which the UE is located in a handover process, and wherein the handover process is triggered when the first dedicated CN network element receives a handover request from a source base station serving the UE in the source cell;
    determining, by the target CN network element according to the CN type information, identifier information of a second dedicated CN network element that supports a CN type indicated by the CN type information, wherein the second dedicated CN network element is a dedicated CN network element that provides a service for a target cell in which the UE is located after the handover process is completed;
    forwarding, by the target CN network element, the forward relocation request message received from the first dedicated CN network element to the second dedicated CN network element;
    handing over, by the target CN network element according to the identifier information, the UE to the second dedicated CN network element corresponding to the identifier information, wherein the handover includes requesting a target base station to establish an air interface for the UE, and wherein the target base station is configured to serve the UE after the handover process is completed; and
    acquiring, by the target CN network element, identifier information of a third dedicated CN network element that supports the CN type indicated by the CN type information responsive to determining, by the target CN network element according to the CN type information, the identifier information of the second dedicated CN network element that supports the CN type indicated by the CN type information when the target CN network element itself does not support the CN type indicated by the CN type information.

5. The method of claim 4, wherein determining, by the target CN network element according to the CN type information, the identifier information of the second dedicated CN network element that supports the CN type indicated by the CN type information comprises:
    determining, by the target CN network element according to a CN type supported by the target CN network element itself, whether the target CN network element itself supports the CN type indicated by the CN type information;
    determining, by the target CN network element, that identifier information of the target CN network element itself is the identifier information of the second dedicated CN network element when the target CN network element itself supports the CN type indicated by the CN type information; and
    determining, by the target CN network element according to the CN type information, the identifier information of the second dedicated CN network element that supports the CN type indicated by the CN type information when the target CN network element itself does not support the CN type indicated by the CN type information.

6. The method of claim 5, further comprising handing over the UE from the first dedicated CN network element to the target CN network element itself responsive to determining, by the target CN network element, that identifier information of the target CN network element itself is the identifier information of the second dedicated CN network element when the target CN network element itself supports the CN type indicated by the CN type information.

7. The method of claim 4, wherein the target CN network element acquires the identifier information of the third dedicated CN network element by initiating a query request to a domain name server (DNS), and wherein the query request is used to query configuration information of all dedicated CN network elements that can provide a service for a location area in which the UE is located.

8. The method of 7, wherein the configuration information returned to the target CN network element includes correspondences between identifier information of all dedicated CN network elements that can provide a service for the location area in which the UE is located and information about CN types supported by the dedicated CN network elements.

9. The method of claim 4, wherein the target CN network element acquires the identifier information of the third dedicated CN network element from configuration information locally presented in the target CN network element.

10. The method of claim 4, wherein each dedicated CN network element is included in a resource pool to which the CN network element device belongs, wherein the forward relocation request message includes a correspondence between identifier information of each dedicated CN network element and information about a CN type supported by each dedicated CN network element.

11. The method of claim 4, wherein handing over the UE to the second dedicated CN network element includes sending a reroute comment from the target CN network element device to the target base station that is configured to serve the UE after the handover is completed.

12. The method of claim 11, wherein the reroute command carries a unique network element identifier and the forward relocation request message received from the first dedicated CN network element, and wherein the unique network element identifier is used to select the second dedicated CN network element.

13. The method of claim 12, wherein the unique network element identifier is selected from a plurality of unique network element identifiers reserved for one or more dedicated mobility management entities.

* * * * *